Jan. 25, 1966   J. B. McDANIEL   3,231,808
ELECTRONIC MOTOR CONTROL
Filed June 24, 1963
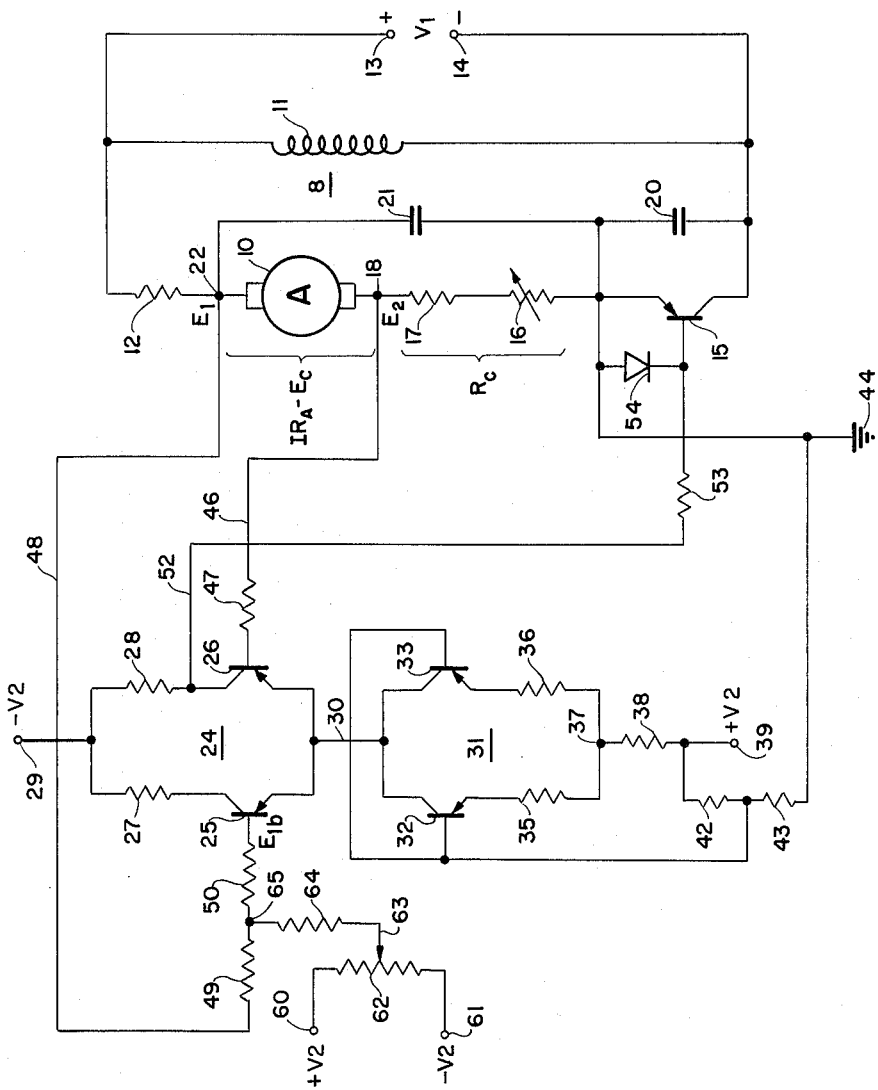
INVENTOR.
JAMES B. Mc DANIEL
BY
Samuel B. Stone
ATTORNEY

United States Patent Office 3,231,808
Patented Jan. 25, 1966

3,231,808
ELECTRONIC MOTOR CONTROL
James B. McDaniel, Brea, Calif., assignor to Beckman Instruments, Inc., a corporation of California
Filed June 24, 1963, Ser. No. 290,013
7 Claims. (Cl. 318—331)

This invention relates to D.C. motor control circuits and more particularly to a circuit for controlling the speed of a D.C. motor throughout a wide range of speeds.

In many applications of electric motors, it not only is necessary that the speed of the motor be controllable, but also, it is required that the speed, when selected, remains substantially constant. Gear trains and/or variable speed drives frequently are employed between an electric motor and a load. However, gear trains frequently have considerable backlash rendering them inaccurate in a precision system, and are bulky and costly.

The speed of an electric motor may be regulated by combining a speed responsive signal derived from a tachometer generator or from the armature of the motor with a reference signal which represents the desired speed of the motor. Systems which employ tachometer generator speed control devices generally are bulky, have relatively high inertia, are costly and lack the accuracy required in many precision systems, such as, optical scanning devices. In the systems which derives a signal from the armature of the motor, generally a signal representative of the counter E.M.F. of the motor is generated or synthesized in some manner. In these systems, the armature voltage is sensed to derive a counter E.M.F. signal. The armature voltage includes the IR drop of the armature windings and brushes, and the counter E.M.F. IR drop compensation is provided to compensate for changes in loading of the motor. The prior systems have employed a resistance in series with the armature to provide a signal proportional to the armature current and thus proportional to the load to compensate for changes in the IR drop. Generally both of these drived signals are inaccurate because compensation cannot be completely provided for the IR drop and other errors introduced by the compensating circuitry. At low speeds the counter E.M.F. is low and the IR drop represents a large proportion of the speed signal, and thus compensation is poor. Likewise, heavy loads increase the IR drop because of the increase in armature current.

Accordingly, it is a feature of the present invention to provide a motor control circuit which accurately controls the speed of the D.C. motor throughout a wide range of speeds heretofore unobtainable with similar precision or accuracy.

According to a further feature of the present invention, a motor control arrangement is provided in which a signal directly proportional to motor speed is derived and in which the effect of IR drop is substantially eliminated.

An additional feature of the present invention resides in the provision of a motor control system in which an error signal proportional to counter E.M.F. is derived and in which the effect of IR drop is substantially eliminated.

An additional feature of the present invention is an improved electronic speed control circuit for a D.C. motor which provides comparison between a signal directly proportional to the counter E.M.F. of the motor and a reference signal, and includes temperature compensation.

In a specific exemplary embodiment of the concepts of the present invention, the armature of a motor is connected in series with a semiconductor control device and a source of voltage. Also connected in series with the armature of the motor is an amount of resistance equal to the resistance of the armature windings and the brushes of the motor. A first control voltage is derived across the armature and the added resistance in series, and this control voltage is equal to the IR drop in the armature plus the IR drop across the added resistance (which IR drop is equal to the IR drop of the armature) minus the counter E.M.F. of the motor. A second control signal is derived across the added resistance and is also equal to the armature IR drop. Electronic circuitry is employed to divide the first control signal by two and to differentially amplify the result thereof with the second control signal. The resulting signal is equal to one half of the counter E.M.F. of the motor armature and is therefore directly proportional to the counter E.M.F. thereof.

A reference voltage may be applied to the electronic circuitry to set the operating speed of the motor. Additionally, at least a portion of the resistance added in series with the motor armature provides temperature compensation. A motor control circuit constructed in accordance with the teachings of the present invention provides control of motor speed within a range of approximately one revolution per second up to a few thousand revolutions per minute while maintaining substantially constant torque.

Other features and objects of the invention will be better understood from a consideration of the following detailed description when read in conjunction with the attached drawing which illustrates an exemplary electronic control circuit for a D.C. motor constructed in accordance with the teachings of the present invention.

Referring now to the drawing, an electronic motor control arrangement is shown which provides continuous adjustment of speed over a very wide speed range. The control circuit is shown connected with a D.C. shunt motor generally indicated by reference numeral 8 having an armature 10 and a shunt winding 11. The circuit provides speed control by controlling the voltage across the armature. This voltage may be considered the sum of the IR drop across the armature and brushes and the back E.M.F. generated by rotation of the armature.

In a conventional control circuit, the voltage across the armature depends on the supply voltage and the back E.M.F. which is a function of speed. At high speeds the back E.M.F. exerts a stabilizing effect on the speed of the motor, but as the speed is reduced and the back E.M.F. becomes a smaller portion of the total voltage the stabilizing effect also becomes smaller. At slow speeds the torque is low and speed regulation is poor. In the control circuit shown in the attached drawing, the voltage applied to the armature is dependent primarily upon the back E.M.F. Even at low speeds the torque is high and essentially constant.

The armature 10 of the motor 8 is connected through an overload resistance 12 to one terminal 13 of a D.C. voltage source denoted V1. A second terminal 14 of the source V1 is connected through the collector-emitter path of a control transistor 15, a variable resistance 16, a temperature compensation resistance 17, and a terminal 18 to the armature 10. The temperature compensation resistance 17 preferably is located adjacent the housing of the motor 8 in order to sense the temperature thereof to provide the desired temperature compensation. A single variable temperature compensation resistance may be used instead of the two separate resistances 16 and 17, if desired. The shunt winding 11 is connected across the source terminals 13 and 14. A capacitance 20 which functions to control damping is connected across the emitter and collector of the transistor 15. A capacitor 21 which functions to smooth the A.C. rectified voltage if such is employed as the source V1, is connected from the emitter of the transistor 15 to a junction 22 between the armature 10 and the resistance 12.

A differential amplifier generally denoted by reference numeral 24 is provided which includes a pair of PNP transistors 25 and 26. The collectors of the transistors 25 and 26 are connected through respective load resistances 27 and 28 to a negative voltage terminal 29. The voltage source connected to the terminal 29 is denoted —V2, with the negative terminal of the source V2 being connected to the terminal 29 and the positive terminal thereof being connected to ground. The emitters of the transistors 25 and 26 are coupled together and connected through a line 30 to a constant current source 31. The constant current source 31 includes a pair of PNP transistors 32 and 33, the collectors of which are connected together and to the line 30. The emitters of the transistors 32 and 33 are connected through respective load resistances 35 and 36 to a terminal 37. A resistance 38 is connected between the terminal 37 and a positive voltage terminal 39. A positive source of voltage, denoted +V2, is connected between the terminal 39 and ground. The constant current source 31 provides highly stable control, and effectively increases the gain of the differential amplifier 24.

A voltage divider including resistances 42 and 43 set the operating characteristics of the transistors 32 and 33, and are connected between the terminal 39 and a ground terminal 44. The junction between the resistances 42 and 43 is connected to the bases of the transistors 32 and 33.

The terminal 18 connected to the armature 10 is connected through a line 46 and a resistance 47 to the base of the transistor 26. The terminal 22 connected to the armature 10 is connected through a line 48 and resistances 49 and 50 to the base of the transistor 25. The resistances 47, 49 and 50 function as current limiting resistances. The collector of the transistor 26 is connected through a line 52 and a resistance 53 to the base of the transistor 15. A diode 54 is connected between the emitter and base of the transistor 15 and serves as a clipping diode to clip peak reverse voltages. The emitter of the transistor 15 is connected to the ground terminal 44.

Positive and negative voltages V2 are connected to respective terminals 60 and 61. A potentiometer 62 having an adjustable tap 63 is connected across the terminals 60 and 61. The adjustable tap 63 is connected through a resistance 64 to a terminal 65 connected between the resistances 49 and 50. The potentiometer 62 provides an adjustable reference voltage which is employed to set the speed of the motor 8. The resistances 49 and 50 are substantially equal and divide the voltage applied from the terminal 22 by two, and the desired reference voltage is added through the resistance 64.

The voltage across the armature 10 is equal to its IR drop minus the counter E.M.F. voltage. This voltage across the armature 10 may be expressed as $$IR_a - E_c$$

The total resistance of the resistances 16 and 17 is chosen to equal the resistance of the armature 10 and the commutator brushes. The total resistance of the resistances 16 and 17 may be termed $R_c$ and, thus $$R_c = R_a$$

The voltage appearing between the terminal 22 and ground 44 which is applied to the resistive divider including the resistances 49 and 50 may be expressed as $$E_1 = IR_a - E_c + IR_c$$

The voltage between the terminal 18 and ground 44 which is applied to the base of transistor 26 by means of lines 46 and resistance 47 may be expressed as $$E_2 = IR_c$$

As noted above, the resistances 49 and 50 are equal and serve to divide by two the voltage applied from the line 48 to the base of the transistor 25. Hence, the voltage applied to the base of the transistor 25 is $$E_{1b} = \frac{2IR_c - E_c}{2} + V_r$$

where, $V_r$ is the reference voltage added by the potentiometer 62. The voltage applied to the base of the transistor 26 is $E_2$. Assuming that the gains of the transistors 25 and 26 are substantially equal and neglecting the overall gain of the differential amplifier 24, the differential amplifier differentially adds the voltages $E_{1b}$ and $E_2$ and provides an output control voltage to the base of the transistor 15

$$V_o = \frac{2IR_c - E_c}{2} - IR_c + V_r$$

$$= IR_c - \frac{E_c}{2} + V_r - IR_c$$

$$= -\frac{E_c}{2} + V_r$$

If $V_r$ is zero, it is seen that the error voltage supplied by the differential amplifier 24 on the line 52 to the base of the transistor 15 is equal to one-half the counter E.M.F. of the armature 10 (multiplied by the gain of the amplifier 24). Thus, an error signal which is truly proportional to counter E.M.F. is derived to control the speed of the motor 8. The magnitude of the reference voltage $V_r$ may be varied to any desired value to set the speed of the motor 8.

The transistor 15 is turned on to provide full current from the source V1 to the armature 10 when the counter E.M.F. drops to make up this loss to thereby maintain the speed of the motor at the desired set speed. Thus, the voltage across the emitter-collector path of the transistor 15 is low at maximum speed and is high at minimum speed.

It should be noted that if the present motor control circuit is used with a load device which requires a continuous speed change, the adjustable tap 63 on the potentiometer 62 may be programmed (or the voltage applied to the tap 63) from a storage unit (such as a tape storage unit) to provide periodic adjustments in the speed of the motor 8.

The following is an example of components which have been found suitable in construction of a motor control circuit as shown in the drawing.

| | |
|---|---|
| Motor 8 | Howard Industries Motor No. 738. |
| Transistor 15 | 2N459. |
| Transistors 26 and 26 | 2N466 (may be matched if desired). |
| Transistors 32 and 33 | 2N466. |
| Diode 54 | 1N1084. |
| Resistance 12 | 82 ohms. |
| Resistance 16 | 100 ohms variable. |
| Resistance 17 | 36 ohms. |
| Resistances 27 and 28 | 3K. |
| Resistances 35 and 36 | 13 ohms. |
| Resistance 38 | 620 ohms. |
| Resistance 42 | 5.1K. |
| Resistance 43 | 10K. |
| Resistance 47 | 5.1K. |
| Resistances 49 and 50 | 10K. |
| Resistance 53 | 100 ohms. |
| Resistance 64 | 3.9K. |
| Potentiometer 62 | 2K. |
| Capacitance 20 | .25 mf. |
| Capacitor 21 | 20 mf. |
| V1 | 80 to 100 volts. |
| V2 | 30 volts. |

It now should be apparent that the present invention provides an improved speed control arrangement for D.C. motors which responds to a signal which is a direct function of the actual counter E.M.F. to control the speed of the motor. An adjustable reference voltage source provides a control for setting the motor to run at various desired speeds throughout a wide range, and temperature compensation is provided.

It will be understood that although an exemplary embodiment of the present invention has been disclosed and discussed, other applications and circuit arrangements are possible and that the embodiment disclosed may be subjected to various changes, modifications, and substitutions without necessarily departing from the spirit of the invention.

What is claimed is:

1. In a motor control circuit including an armature having first and second terminals, variable impedance means, and controllable impedance means connected in series between terminals adapted to receive a source of voltage, the improvement comprising
    said variable impedance means having an impedance value equal to the impedance presented by said armature, including the winding and brush impedance thereof,
    a common terminal connected between said variable impedance means and said controllable impedance,
    terminals for receiving a source of reference voltage,
    a voltage divider,
    means connecting said terminals for receiving a source of reference voltage to said voltage divider,
    means connecting a first terminal of said armature to said voltage divider,
    combining means having two input terminals, a common terminal and an output terminal for differentially amplifying signals applied to the input terminals thereof and providing an output signal on said output terminal,
    means connecting said dividing means to a first of the input terminals of said combining means,
    means connecting a second of the terminals of said armature to the second input terminal of said combining means, and
    means connecting the output terminal of said combining means to said controllable impedance to control the impedance thereof, whereby said combining means provides an output signal directly proportional to the counter E.M.F. produced by said armature and controls said controllable impedance in response thereto.

2. A device as in claim 1 wherein
    said voltage divider receives a voltage equal to twice the IR drop in said armature minus the counter E.M.F. thereof, divides this voltage by two and applies it to said first input terminal of said combining means,
    said combining means receives at its second input terminal a signal equal to the IR drop of said armature, and
    said terminal adapted to be connected to said reference voltage source provides a variable voltage which may be added to or substracted from the voltage applied by said voltage divider to the first terminal of said combining means to thereby set the speed at which said armature rotates.

3. A device as in claim 1 wherein
    at least a portion of said variable impedance means is a temperature compensating impedance.

4. A device as in claim 3 wherein
    said temperature compensating impedance is physically located adjacent said armature to sense the temperature thereof.

5. A device as in claim 2 wherein
    said voltage divider comprises a pair of resistances of equal value,
    said combining means comprises a differential transistor amplifier,
    and said controllable impedance means includes a semiconductor.

6. A device as in claim 5 wherein
    said combining means includes a constant current source connected to said differential amplifier.

7. A device as in claim 6 wherein
    said differential amplifier includes a pair of transistors connected in parallel between third and fourth terminals, said constant current source includes a pair of transistors connected in parallel between said fourth terminal and a fifth terminal,
    said third and fifth terminals being adapted to be connected to a supply voltage, and
    means coupling similar electrodes of said pair of transistors in said constant current source to said common terminal connected between said variable impedance means and said controllable impedance.

No references cited.

ORIS L. RADER, *Primary Examiner.*